(12) United States Patent
Al-Tayawe et al.

(10) Patent No.: US 9,387,936 B2
(45) Date of Patent: Jul. 12, 2016

(54) FUEL PRESSURE SENSOR LINE RESERVOIR (71) Applicant: AIRBUS OPERATIONS LIMITED, Bristol (GB)

(72) Inventors: Osama Al-Tayawe, Bristol (GB); Stephen Andrew Hobbs, Bristol (GB); Andrew Ryan, Bristol (GB); Thambirajah Sivarajah, Bristol (GB)

(73) Assignee: Airbus Operations Limited, Bristol (GB)

( * ) Notice: Subject to any disclaimer, the term of this patent is extended or adjusted under 35 U.S.C. 154(b) by 124 days.

(21) Appl. No.: 14/166,922

(22) Filed: Jan. 29, 2014

(65) Prior Publication Data

US 2014/0209749 A1 Jul. 31, 2014

(30) Foreign Application Priority Data

Jan. 29, 2013 (GB) .................................. 1301527.6

(51) Int. Cl.
*B64D 37/14* (2006.01)
*F02M 21/02* (2006.01)
*B64D 37/00* (2006.01)

(52) U.S. Cl.
CPC .............. *B64D 37/14* (2013.01); *B64D 37/005* (2013.01); *F02M 21/0218* (2013.01); *F02M 21/0293* (2013.01)

(58) Field of Classification Search
CPC ...... B64D 37/005; B64D 37/14; B64D 37/16; B64D 37/18; B64D 39/00; F02M 21/0293; F02M 21/0218; F02D 2200/06
See application file for complete search history.

(56) References Cited

U.S. PATENT DOCUMENTS

| 2,865,539 | A | * | 12/1958 | Edwards | B64D 37/16 222/333 |
| 3,140,368 | A | * | 7/1964 | Young | B64D 37/16 200/81.9 R |
| 3,771,542 | A | | 11/1973 | Williams | |
| 4,870,392 | A | * | 9/1989 | Baltz | F02B 77/08 340/608 |

(Continued)

FOREIGN PATENT DOCUMENTS

| EP | 2 423 656 | 2/2012 |
| GB | 577457 | 5/1946 |

(Continued)

OTHER PUBLICATIONS

Extended European Search Report dated May 15, 2014 in EP 14152002.3.

(Continued)

*Primary Examiner* — Tien Dinh
*Assistant Examiner* — Alexander V Giczy
(74) *Attorney, Agent, or Firm* — Nixon & Vanderhye P.C.

(57) ABSTRACT

The present invention concerns a device for use in an aircraft fuel pressure sensor line. More particularly, but not exclusively, this invention concerns a fuel pressure sensor line connecting an aircraft fuel pump to a pressure sensor. The invention also concerns a fuel pressure sensor line reservoir for use with a sensor line connecting an aircraft fuel pump to a pressure sensor. An aircraft fuel pump system comprises an aircraft fuel pump and a pressure sensor connected the aircraft fuel pump via a sensor line. The sensor line includes a reservoir located between the aircraft fuel pump and the pressure sensor. The reservoir acts to prevent liquid contacting the pressure switch when the fuel pump is not active.

11 Claims, 7 Drawing Sheets

(56) References Cited

U.S. PATENT DOCUMENTS

| | | | |
|---|---|---|---|
| 4,920,942 A * | 5/1990 | Fujimori | F02D 41/3082 |
| | | | 123/494 |
| 4,932,609 A | 6/1990 | Secchiaroli et al. | |
| 5,024,188 A * | 6/1991 | Hartke | F02B 61/045 |
| | | | 123/195 A |
| 5,868,111 A * | 2/1999 | Augustin | F02D 41/22 |
| | | | 123/198 D |
| 5,961,293 A * | 10/1999 | Clemmons | F02M 37/10 |
| | | | 417/410.4 |
| 6,170,470 B1 | 1/2001 | Clarkson et al. | |
| 6,231,318 B1 | 5/2001 | Cotton | |
| 8,117,909 B1 | 2/2012 | LaClair et al. | |
| 2003/0221674 A1 * | 12/2003 | Scanderbeg | F02D 41/22 |
| | | | 123/479 |
| 2007/0108856 A1 * | 5/2007 | Gras | F02D 33/006 |
| | | | 310/68 R |
| 2008/0150552 A1 | 6/2008 | Straub | |
| 2013/0226474 A1 * | 8/2013 | Adler | G01L 27/00 |
| | | | 702/50 |

FOREIGN PATENT DOCUMENTS

| | | |
|---|---|---|
| GB | 2 158 150 | 11/1985 |
| GB | 2 316 631 | 3/1998 |
| WO | WO 02/29365 | 4/2002 |

OTHER PUBLICATIONS

Search Report for GB1301527.6, dated Apr. 26, 2013.
Search Report for GB1301527.6, dated Nov. 21, 2013.

* cited by examiner

FUEL PRESSURE SENSOR LINE RESERVOIR

This application claims priority to UK Patent Application No. 1301527.6 filed 29 Jan. 2013, the entire content of which is hereby incorporated by reference.

BACKGROUND OF THE INVENTION

The present invention concerns a device for use in an aircraft fuel pressure sensor line. More particularly, but not exclusively, this invention concerns a fuel pressure sensor line connecting an aircraft fuel pump to a pressure sensor. The invention also concerns a fuel pressure sensor line reservoir for use with a sensor line connecting an aircraft fuel pump to a pressure sensor.

Large aircraft, such as the Airbus A380, include several fuel tanks, with fuel being stored in a number of fuel tanks located in the wings of the aircraft. In order to move the fuel from a fuel tank into an engine, or to move fuel between different fuel tanks during flight, an aircraft fuel tank may be provided with fuel transfer pumps. In order to be able to detect whether or not a fuel transfer pump is working, a sensor line may be connected to a feed line leading from the fuel pump outlet, the sensor line leading to a pressure switch associated with the sensor line. The pressure switch may comprise a diaphragm and a certain amount of residual air. When the pump is operational, the feed line pushes the fuel and water mix typically found in an aircraft fuel tank up the sensor line towards the pressure switch compressing the air in the switch. The pressure increase due to the fuel flow pressure, a typical example of which is 30 psi, activates the pressure switch and provides an indication that the fuel pump is working correctly. If the fuel pressure switch is not activated, a monitoring system may inform the aircraft operator that the fuel pump is not working, for example using a warning light and/or audible alarm.

However, the above described operation may cause problems. As the fuel pump goes through operational cycles of being on and off, water may build up in the pressure switch, potentially due to the greater density of water compared to aircraft fuel. The pressure switch may begin to act as a sump and collect the water. The water in the switch may then freeze and prevent the proper operation of the pressure switch. This may result in an indication that the fuel pump is not operating correctly, even when it is operating correctly. An investigation of the fault may cause the aircraft to be grounded, thus increasing the downtime of the aircraft, causing an airline operator a financial loss. The problem of pressure switches freezing may be most noticeable in the outer wing fuel tanks, due to the low relative height of the pressure switches compared to the fuel pumps. As an aircraft takes off and pitches to 18 degrees, any residual fuel/water mix that has remained in the feed line and sensor line can flow into the pressure switch where it again acts as a sump and retains the unwanted water, thus leaving the pressure switch vulnerable to freezing.

Proposals for overcoming the problem of freezing pressure switches include the following.

One proposed solution is to position the fuel pump and pressure switch such that the sensor line maintains a positive gradient during take-off, thus preventing the fuel/water mix travelling into the pressure switch as the aircraft pitch increases. Such a solution may be used in fuel tanks inboard of the outer wing tanks and pressure switches in such tanks have a lower failure rate than when this is not the case. However, such arrangements may not be feasible in existing aircraft, because of the cost of retrofitting such a solution, or because of the space restrictions in those aircraft fuel tanks.

An alternative solution is to change the route of the sensor line such that it maintains a positive gradient during takeoff. However, similar design restrictions as listed above apply when attempting to reroute the sensor line. Also, such a reroute may require the addition of a sharp negative angle into part of the sensor line, which could act to channel any condensation or water build up into the pressure switch.

Another alternative solution is to fill the pressure switch with Ethylene Glycol, which acts as an anti-freeze when mixed with water. However, this is a temporary solution only as the fuel/water mix will still enter the pressure switch and could eventually flush out the Ethylene Glycol.

The present invention seeks to mitigate the above-mentioned problems.

SUMMARY OF THE INVENTION

The present invention provides, according to a first aspect, an aircraft fuel pump system comprising:

an aircraft fuel pump; and a pressure sensor connected to the aircraft fuel pump via a sensor line, wherein the sensor line includes a reservoir located between the aircraft fuel pump and the pressure sensor.

The reservoir acts to hold any residual fuel/water mix away from the pressure switch when the fuel pump is not in operation. Preferably, the reservoir acts to define a wet sensor line between the aircraft fuel pump and the reservoir and a dry sensor line between the reservoir and pressure switch. The wet sensor line preferably contains a fuel/water mix. The dry sensor line preferably contains air, more preferably with no fuel/water mix in the dry sensor line. The reservoir is preferably arranged to contain any fluid pushed into the reservoir by the activation of the aircraft fuel pump, and transmit the pressure increase to the pressure switch by allowing the compression of the air present in the dry sensor line. By keeping the pressure switch as dry as possible, the chances of the switch freezing are reduced.

The reservoir may comprise an input, a sump, and an output. The reservoir may be configured such that there is no direct linear flow path between the input and the output. That there is no direct linear flow path between the input and the output means that fluid entering reservoir by the input, if maintaining the same direction of flow as taken through the input, will not directly flow into and out of the output. Instead, the fluid entering the reservoir via the input flow into the sump, where the flow direction of the fluid must change in order to leave the sump via the output. The reservoir may be configured such that the sump must be substantially full of a fuel/water mix before the fuel/water mix can pass through the reservoir. Advantageously, in such an arrangement, the flow of the fuel/water mix will first pass through the reservoir input, fill the sump, and only then pass through the reservoir output. Preferably, the reservoir contains air. Preferably, as a fuel/water mix enters the sump, air within the reservoir is compressed. Preferably, the compressed air transmits pressure via the output of the reservoir to the pressure switch. Preferably, the compressed air transmits pressure via the output of the reservoir and the dry sensor line to the pressure switch. Preferably, the reservoir is configured such that a fuel/water mix can only pass through the reservoir when substantially all of the air present in the reservoir has been expelled. Preferably, the sensor line and pressure sensor provides a closed circuit, i.e. fuel/water and air does not pass through the pressure sensor for recirculation back around into the aircraft fuel tanks.

Advantageously, the internal geometry of the reservoir inhibits either or both of the horizontal and vertical movement of the fuel/water mix during extreme aircraft pitch angles and/or negative G environments. Preferably, the internal geometry of the reservoir inhibits the flow of the fuel/water mix through the reservoir during extreme aircraft pitch angles and/or negative G environments. The reservoir may be configured to protect against pressure spikes during the fuel pump operation damaging the pressure sensor.

Experimental tests of fuel sensor lines according to the prior art have shown that the sensor line only fills to a volume of 70% during operation of the fuel pump, with the remaining volume being filled by air. The reservoir may be placed such that the fuel/water mix remains in the sensor line between the fuel pump and the reservoir, and the reservoir itself, with the sensor line between the pressure switch and the reservoir remaining mostly dry. The positioning and configuration of the reservoir to achieve this may be determined experimentally. The reservoir is preferably configured such that any fuel/water mix remaining in the sensor line between the fuel pump and the reservoir when the aircraft fuel pump is not operational is prevented from travelling past the reservoir towards the pressure switch due to the sump receiving the fuel/water mix. The configuration of the reservoir is preferably such that the air present between the reservoir and the pressure switch acts as an air bubble, preventing the flow of fuel/water mix between the reservoir and the pressure switch.

According to a second aspect of the invention there is also provided a reservoir for installation on a sensor line in an aircraft fuel pump system, the reservoir comprising an inlet, a sump, and an outlet, configured such that the sump must be substantially full before liquid can pass through the reservoir.

According to a third aspect of the invention, there is provided an aircraft fuel tank, the aircraft fuel comprising an aircraft fuel pump system as described above.

According to a fourth aspect of the invention, there is provided an aircraft wing, the aircraft wing comprising an aircraft fuel tank including an aircraft fuel pump system as described above.

According to a fifth aspect of the invention, there is provided an aircraft, the aircraft comprising a fuel tank including an aircraft fuel pump system as described above.

It will of course be appreciated that features described in relation to one aspect of the present invention may be incorporated into other aspects of the present invention. For example, the first aspect of the invention may incorporate any of the features described with reference to the second aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
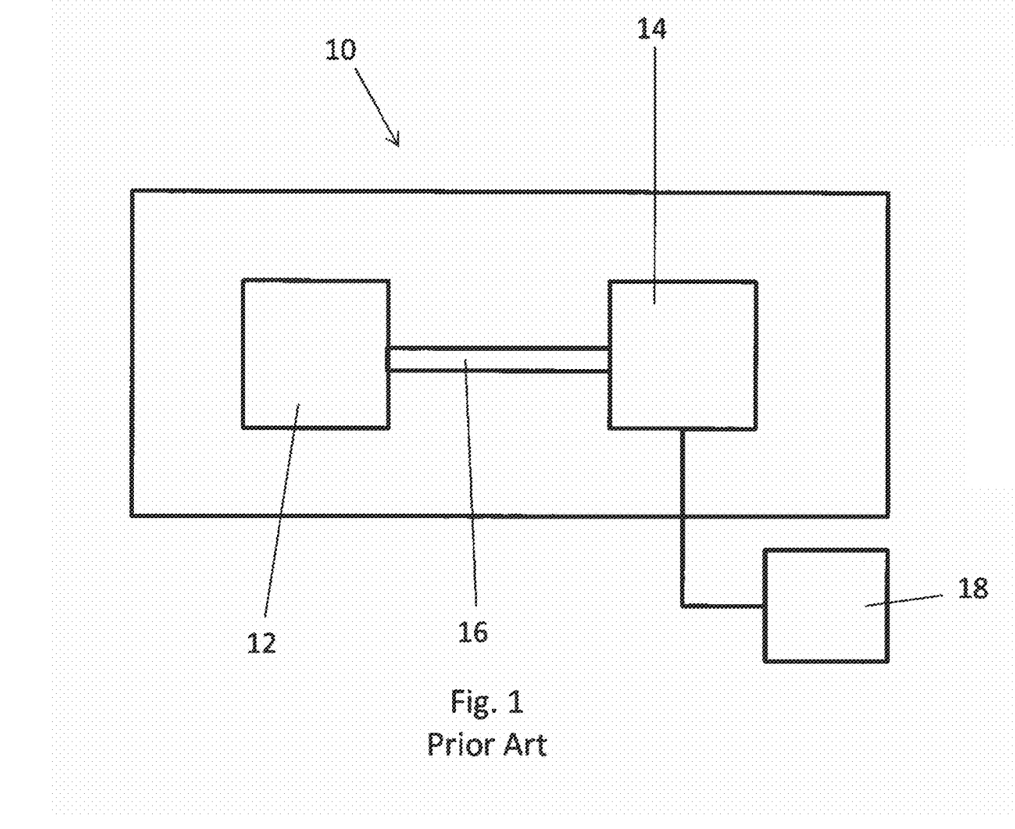
FIG. 1 shows a schematic view of an aircraft fuel pump system according to the prior art.

FIG. 1 shows a prior art fuel tank system, comprising an aircraft fuel tank 10 including an aircraft fuel pump 12, the aircraft fuel pump 12 being connected to a pressure sensor 14 via a sensor line 16. As has been explained, when the aircraft fuel pump 12 is in operation, the sensor line 16 passes a fuel/water mix towards the pressure sensor 14, which is activated and may send a signal to an aircraft control unit 18 indicating that the aircraft fuel pump 12 is operating correctly. The sensor line 16 contains a fuel/water mix and a certain amount of air, and the fuel/water mix may enter the pressure switch, leaving it vulnerable to freezing. The aircraft fuel pump 12 is connected to a transfer pipe (not shown) which transmits fuel from one aircraft fuel tank to another.

Figure 2:
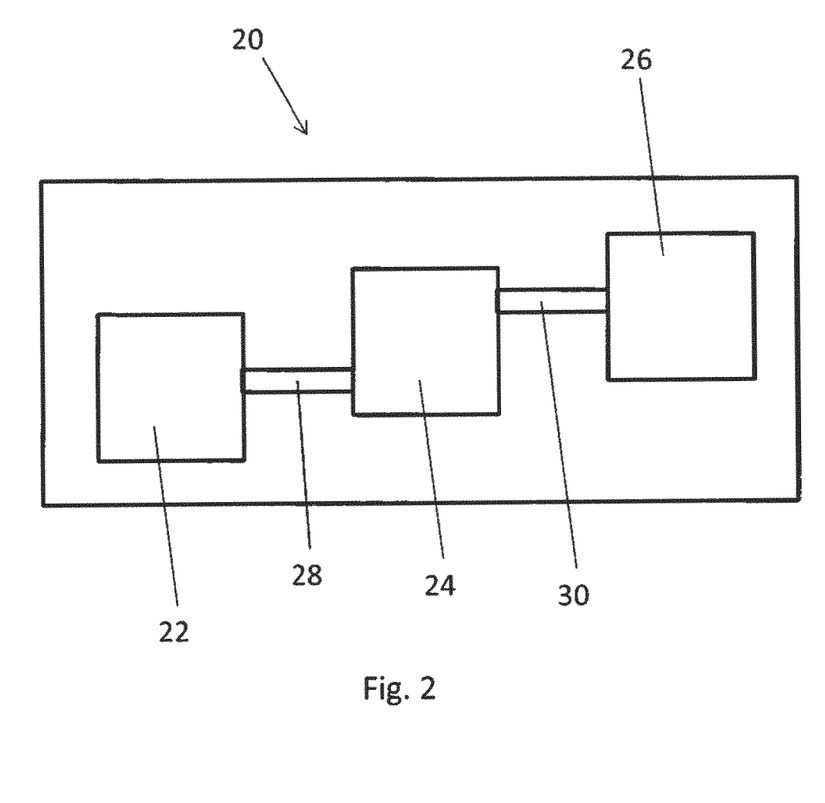
FIG. 2 shows a schematic view of an aircraft fuel pump system according to a first embodiment of the invention.

FIG. 2 shows a first aspect of the present invention. An aircraft fuel tank 20 includes an aircraft fuel pump 22, a reservoir 24, and a pressure sensor 26. The pressure sensor 26 is attached to a control unit as is conventional in the prior art. The aircraft fuel pump 22 is connected to a transfer pipe (not shown to improve clarity) as is conventional in the prior art. The aircraft fuel pump 22 is connected with the reservoir 24 via a first section of sensor line 28, also known as the wet sensor line, and the reservoir 24 is also connected with the pressure sensor 26 via a second section of sensor line 30, also known as the dry sensor line. The first section of sensor line 28 feeds into the reservoir 24 via an input (not shown in FIG. 2) and the second section of sensor line 30 feeds out of the reservoir 24 via an output (not shown in FIG. 2). As will be better illustrated in FIGS. 3 to 6, there is no direct linear flow path between the input and output of the reservoir 24.

Figure 3:
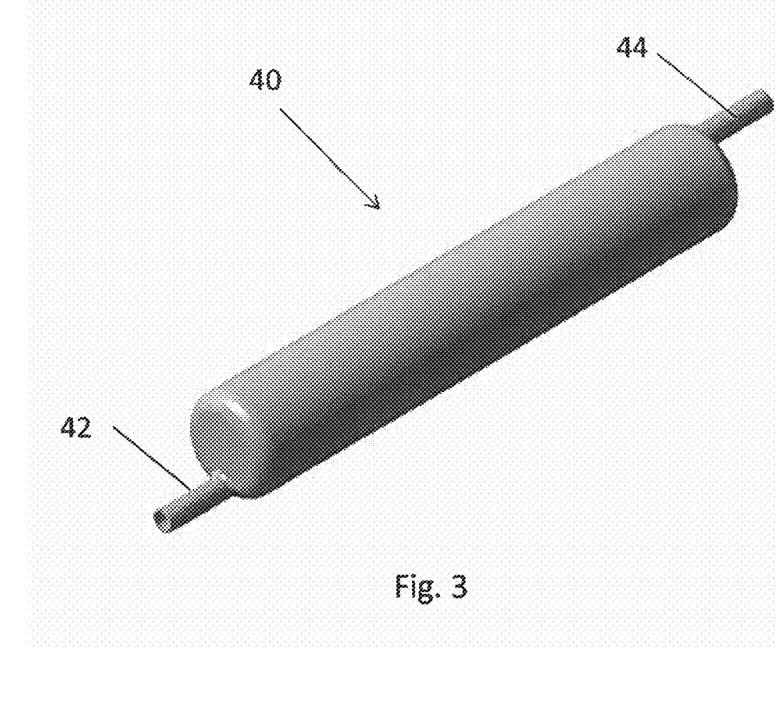
FIG. 3 shows an external view of a reservoir according to a second embodiment of the invention.

FIG. 3 shows an external view of a reservoir 40 according to one aspect of the invention, the reservoir comprising an input 42 and an output 44.

Figure 4A:
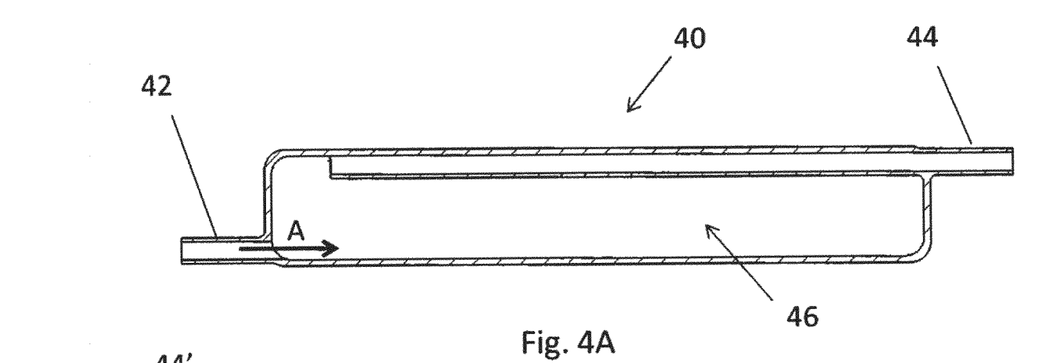
FIG. 4A shows a cross-sectional view of a first possible internal configuration of the reservoir shown in FIG. 3.

FIG. 4A shows a cross sectional view of a first possible internal configuration of the reservoir 40. The input 42 feeds into a sump 46, the sump 46 extending in the same direction as the fluid flow through the input 42. The direction of flow through the input 42 is indicated by the arrow A. The output 44 is offset from the input 42, and runs in a parallel direction to the input 42. As can be seen in FIG. 4A, the sump extends beyond the opening of the output 44 in what may be considered a "downstream" direction. Therefore, a fuel/water mix entering the reservoir via the input 42 will first travel to the end of the sump 46, and fill the sump 46, before being able to travel out of the reservoir via the output 44. The reservoir is arranged such that when the fuel pump system is installed in an aircraft fuel tank, the input 42 is generally arranged to be oriented below the output 44 when the aircraft is at an approximately level pitch. During a flight, a change of pitch of the aircraft to which the system is installed may result in the input 42 being oriented above the output 44, but the configuration of the reservoir 40 is such that the fuel/water mix should not pass beyond the reservoir 40 towards the pressure switch in the system.

As the aircraft fuel pump is activated, a fuel/water mix is transmitted into the reservoir 40 via the inlet 42. Air present in the sump 46 will be displaced, compressing the air present in the outlet 44, the compression of which goes on to activate a pressure switch. The amount of air present in the system preferably does not allow the fuel/water mix entering the sump 46 to pass through the reservoir 40, due to the level of compression of the air being required being too great to be achieved by the aircraft fuel pump.

Figure 4B:
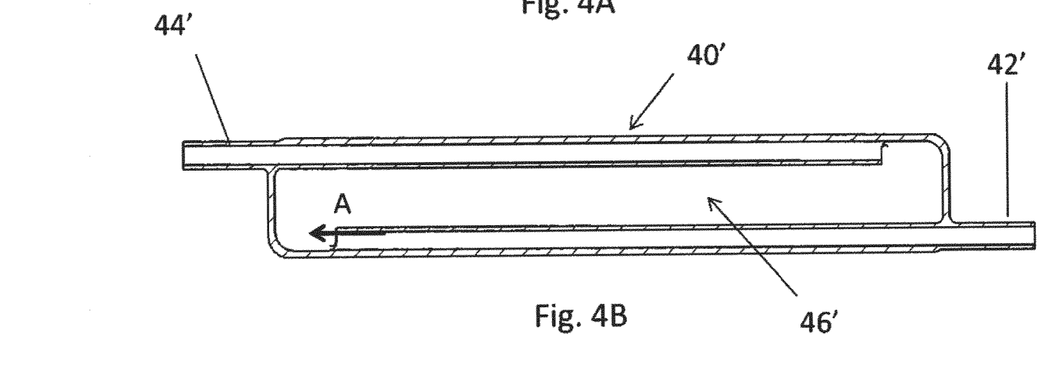
FIG. 4B shows a cross-sectional view of a second possible internal configuration of the reservoir shown in FIG. 3

FIG. 4B shows a cross-sectional view of a second possible internal configuration of the reservoir 40. The outlet 44' is configured in the same way as in FIG. 4A, but the inlet 42' extends into the sump 46' as shown. As described above, air within the reservoir acts under compression so as to prevent the passage of fuel/water mix through the reservoir.

Figure 5:
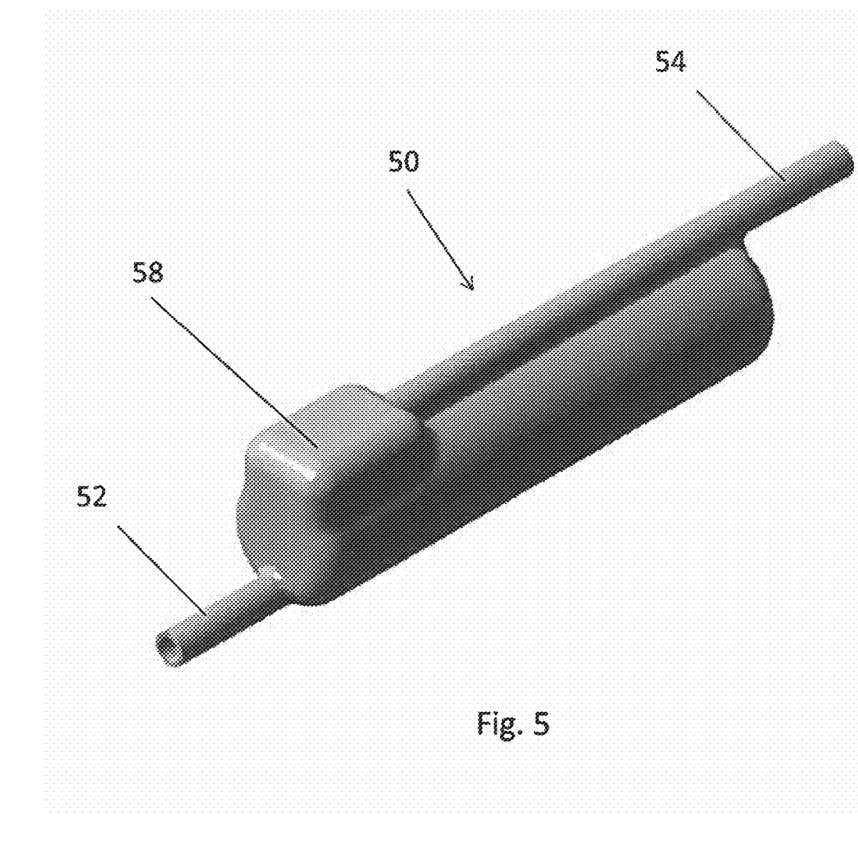
FIG. 5 shows an external view of a reservoir according to a third embodiment of the invention.

FIG. 5 shows an external view of a reservoir 50 according to a third aspect of the invention. The reservoir 50 is approximately cylindrical and includes an outlet 54. The outlet 54 is associated with an expanded portion 58, which expands the cross-section of the reservoir 50 beyond the circumference of the cylinder. The expanded portion 58 is arranged to increase the amount of air capable of being stored within the reservoir 50 in proximity to the outlet 54.

Figure 6A:
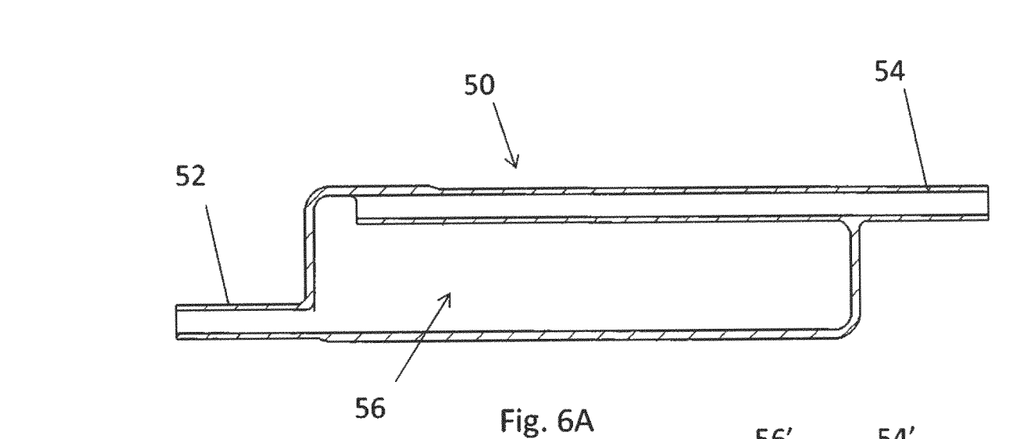
FIG. 6A shows a cross-sectional view of a first possible internal configuration of the reservoir shown in FIG. 5.
Figure 6B:
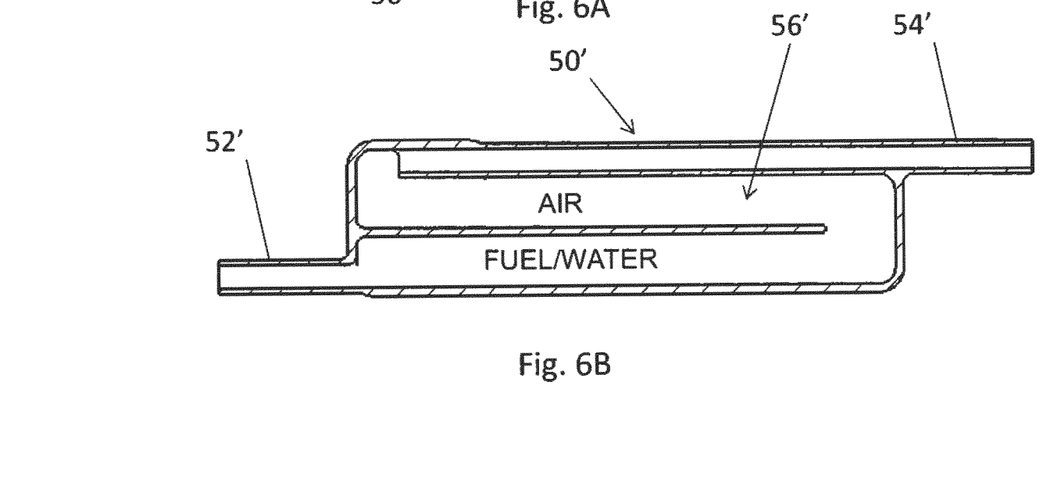
FIG. 6B shows a cross-sectional view of a second possible internal configuration of the reservoir shown in FIG. 5.

FIGS. 6A and 6B show a first possible and second possible internal configuration of the reservoir 50. As the internal configurations correspond approximately to those shown in FIGS. 4A and 4B, no great detail will be provided. FIG. 6A shows the reservoir 50 including an inlet 52, and outlet 54, and a sump 56. The main difference with the embodiment shown in FIG. 4A is the presence of the expanded portion 58, which acts to increase the air storage space within the reservoir 50 compared to a similarly dimensioned reservoir 40. FIG. 6B shows the reservoir 50' including an inlet 52', and outlet 54', and a sump 56'. In a preferred embodiment, during activation of an aircraft fuel pump the sump 56' is configured to receive a fuel/water mix in the bottom part of the sump, immediately adjacent to the inlet 52', and the top part of the sump 56' is filled with air, as indicated in the figure. The embodiment shown in FIG. 6B can be seen to be configured to make it even more difficult for a fuel/water mix to pass through the reservoir and into a pressure switch. It can be seen, as for the embodiments described above also, that there is no direct fluid flow path between the input and output of the reservoir, and that in order to pass through the reservoir, fluid first has to substantially fill the sump 56, which due to the amount of air within the reservoir is not usually possible when installed in an aircraft fuel system.

Figure 7:
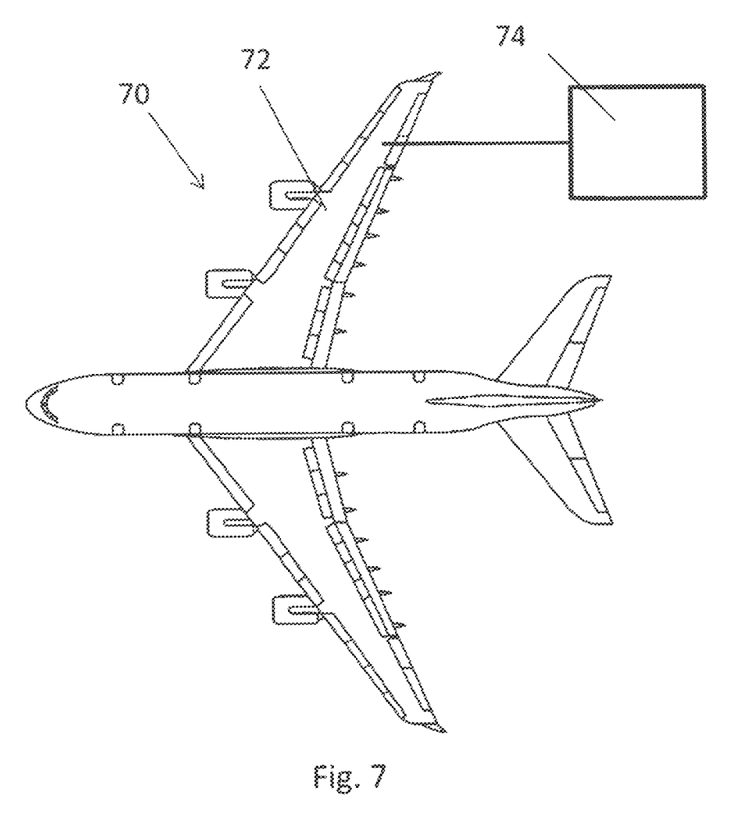
FIG. 7 shows an aircraft including an aircraft wing including an aircraft fuel tank according to the invention.

FIG. 7 shows an aircraft 70 including a wing 72. The wing 72 includes an aircraft fuel tank 74, with the aircraft fuel tank including a fuel pump sensor system according to any aspect of the invention described above.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft fuel pump system comprising:
   an aircraft fuel pump;
   a pressure sensor connected to the aircraft fuel pump via a sensor line, wherein the sensor line includes a reservoir located between the aircraft fuel pump and the pressure sensor and the sensor line is arranged to pass a fuel and water fluid mix towards the pressure sensor when the aircraft fuel pump is in operation;
   the reservoir comprising an input, a sump, and an outlet, wherein the input and the outlet are separate and distinct from each other;
   the sensor line comprising a wet sensor line between the aircraft fuel pump and the input to the reservoir and a dry sensor line between the outlet from the reservoir and the pressure sensor; and
   wherein the reservoir is configured such that there is no linear fluid path extending from the inlet to the outlet of the reservoir, which is aligned with an axis of the inlet or an axis of the outlet, and
   wherein the reservoir is configured such that the sump must be substantially full of the fuel and water fluid mix before the fuel and water mix can pass through reservoir from the inlet to the outlet.

2. The aircraft fuel pump system according to claim 1, wherein the reservoir is configured such that any of the fuel and water fluid mix remaining in the wet sensor line between the fuel pump and the reservoir is prevented from travelling past the reservoir towards the pressure sensor when the fuel pump is not active.

3. An aircraft fuel system reservoir for installation on a sensor line in an aircraft fuel pump system, the aircraft fuel system reservoir comprising:
   an inlet and an outlet,
   a sump, and
   the aircraft fuel system reservoir is configured such that the sump is in a full condition before liquid fluid passes through the reservoir, and there is no direct linear flow path between the inlet and the outlet which is aligned with an axis of the inlet or the outlet.

4. An aircraft fuel tank comprising an aircraft fuel pump system claimed in claim 1.

5. An aircraft wing, the aircraft wing comprising an aircraft fuel tank including an aircraft fuel pump system as claimed in claim 1.

6. An aircraft, the aircraft comprising a fuel tank including an aircraft fuel pump system claimed in claim 1.

7. An aircraft fuel pump system comprising:
   an aircraft fuel pump;
   a wet sensor line between the aircraft fuel pump and a reservoir, wherein the wet sensor line defines a liquid fluid passage between the aircraft fuel pump and the reservoir;
   the reservoir including an interior sump having a liquid fluid section and a gaseous fluid section, wherein the set sensor line is coupled to an inlet to the sump adjacent the liquid fluid section;
   an outlet from the sump adjacent the gaseous fluid section;
   a dry sensor line coupled to the outlet;
   a pressure sensor coupled to the dry sensor line and configured to sense a pressure of the gaseous fluid section of the reservoir,
   wherein there is no linear fluid path extending from the inlet to the outlet of the reservoir which is aligned with an axis of the inlet or an axis of the outlet, and wherein the reservoir is configured such that the sump must be substantially full of liquid fluid before the liquid fluid can pass through the reservoir from the inlet to the outlet.

8. The aircraft fuel pump system of claim 7 wherein the outlet to the reservoir is at an uppermost elevation of the sump in the reservoir.

9. The aircraft fuel pump of claim 7 wherein the outlet from the reservoir includes an outlet passage extending along at least one half of a length of an upper wall of the sump.

10. The aircraft fuel pump of claim 9 wherein the inlet of the sump includes an inlet passage extending along at least one half of a length of a bottom wall of the sump.

11. The aircraft fuel pump of claim 10 wherein the inlet passage and the outlet passage overlap in the sump.

* * * * *